United States Patent
Chen et al.

(10) Patent No.: US 9,805,875 B2
(45) Date of Patent: Oct. 31, 2017

(54) CAPACITOR AND MANUFACTURING METHOD THEREOF

(71) Applicant: Unimicron Technology Corp., Taoyuan (TW)

(72) Inventors: Yin-Ju Chen, Chiayi County (TW); Cheng-Po Yu, Taoyuan (TW)

(73) Assignee: Unimicron Technology Corp., Taoyuan (TW)

( * ) Notice: Subject to any disclaimer, the term of this patent is extended or adjusted under 35 U.S.C. 154(b) by 145 days.

(21) Appl. No.: 14/705,950

(22) Filed: May 6, 2015

(65) Prior Publication Data

US 2016/0329154 A1   Nov. 10, 2016

(51) Int. Cl.

| | |
|---|---|
| H01G 11/58 | (2013.01) |
| H01G 11/24 | (2013.01) |
| H01G 9/035 | (2006.01) |
| H01G 9/145 | (2006.01) |
| H01G 9/00 | (2006.01) |
| H01G 9/02 | (2006.01) |
| H01G 9/04 | (2006.01) |

(52) U.S. Cl.
CPC .......... *H01G 9/035* (2013.01); *H01G 9/0029* (2013.01); *H01G 9/02* (2013.01); *H01G 9/145* (2013.01); *H01G 9/04* (2013.01)

(58) Field of Classification Search
CPC ...................................................... H01G 11/52
USPC ................................................... 361/502, 512
See application file for complete search history.

(56) References Cited

U.S. PATENT DOCUMENTS

| | | | | |
|---|---|---|---|---|
| 5,963,419 A * | 10/1999 | Tanaka | ..................... | H01G 9/02 361/512 |
| 6,198,623 B1 * | 3/2001 | Amatucci | ................ | H01G 9/02 361/511 |
| 6,212,062 B1 * | 4/2001 | Day | ...................... | H01G 9/012 29/25.03 |
| 6,704,192 B2 * | 3/2004 | Pekala | ................... | H01G 9/042 29/25.03 |
| 7,990,679 B2 | 8/2011 | Ehrenberg et al. | | |
| 2002/0080558 A1 * | 6/2002 | Nonaka | ................... | H01G 9/04 361/502 |
| 2013/0088244 A1 | 4/2013 | Gryska et al. | | |

* cited by examiner

*Primary Examiner* — Eric Thomas
(74) *Attorney, Agent, or Firm* — JCIPRNET

(57) ABSTRACT

A capacitor and a manufacturing method thereof are provided. The capacitor includes a porous substrate, an electrolyte composition, and a pair of electrodes. The porous substrate has a plurality of holes. The electrolyte composition is located in the holes of the porous substrate, and the electrolyte composition includes an electrolyte solution and a nano carbon material dispersed in the electrolyte solution. The electrodes are respectively located on two opposite surfaces of the porous substrate.

7 Claims, 1 Drawing Sheet

CAPACITOR AND MANUFACTURING METHOD THEREOF

BACKGROUND OF THE INVENTION

Field of the Invention

The invention relates to a capacitor and a manufacturing method thereof, and more particularly, to a capacitor having a porous substrate and an electrolyte composition and a manufacturing method thereof.

Description of Related Art

A capacitor has the capability of storing energy, and is therefore extensively applied in electronic products. According to different dielectric materials, the capacitor can be divided into a liquid-state capacitor and a solid-state capacitor, wherein the dielectric material of the solid-state capacitor is generally a conductive polymer, and the dielectric material of the liquid-state capacitor is generally an electrolyte solution.

Under prolonged use of the liquid-state capacitor, the electrolyte solution in the capacitor is expanded due to excessive temperature, and therefore the capacitor is readily ruptured and the issue of leakage is generated as a result, even resulting in the dangerous phenomenon of explosion due to a temperature exceeding the boiling point of the electrolyte solution.

SUMMARY OF THE INVENTION

The invention provides a capacitor having a porous substrate and an electrolyte composition.

The invention provides a manufacturing method of a capacitor capable of manufacturing a capacitor having a porous substrate and an electrolyte composition.

A capacitor of an embodiment of the invention includes a porous substrate, an electrolyte composition, and a pair of electrodes. The porous substrate has a plurality of holes. The electrolyte composition is located in the holes of the porous substrate, and the electrolyte composition includes an electrolyte solution and a nano carbon material dispersed in the electrolyte solution. The pair of electrodes is respectively located on two opposite surfaces of the porous substrate.

According to a capacitor of an embodiment of the invention, the material of the porous substrate is, for instance, melamine, polystyrene, polyurethane, polyethylene, ethylene-vinyl acetate copolymer, thermoplastic elastomer, or polyvinyl chloride.

According to a capacitor of an embodiment of the invention, based on a total weight of the electrolyte composition, the content of the nano carbon material is, for instance, between 1% and 10%.

According to a capacitor of an embodiment of the invention, the nano carbon material is, for instance, expanded graphite or carbon aerogel.

According to a capacitor of an embodiment of the invention, the carbon aerogel includes a particle having a particle size between 3 nm and 20 nm.

According to a capacitor of an embodiment of the invention, the porosity of the carbon aerogel exceeds, for instance, 50%.

According to a capacitor of an embodiment of the invention, the specific surface area of the carbon aerogel is, for instance, between 400 m$^2$/g and 1000 m$^2$/g.

A manufacturing method of a capacitor of an embodiment of the invention includes first mixing a nano carbon material and an electrolyte solution to obtain an electrolyte composition. Then, a porous substrate is immersed in the electrolyte composition. Then, electrodes are formed on two opposite surfaces of the porous substrate.

According to a manufacturing method of a capacitor of an embodiment of the invention, the material of the porous substrate is, for instance, melamine, polystyrene, polyurethane, polyethylene, ethylene-vinyl acetate copolymer, thermoplastic elastomer, or polyvinyl chloride.

According to a manufacturing method of a capacitor of an embodiment of the invention, based on a total weight of the electrolyte composition, the content of the nano carbon material is, for instance, between 1% and 10%.

According to a manufacturing method of a capacitor of an embodiment of the invention, the nano carbon material is, for instance, expanded graphite or carbon aerogel.

According to a manufacturing method of a capacitor of an embodiment of the invention, the carbon aerogel includes a particle having a particle size between 3 nm and 20 nm.

According to a manufacturing method of a capacitor of an embodiment of the invention, the porosity of the carbon aerogel exceeds, for instance, 50%.

According to a manufacturing method of a capacitor of an embodiment of the invention, the specific surface area of the carbon aerogel is, for instance, between 400 m$^2$/g and 1000 m$^2$/g.

According to a manufacturing method of a capacitor of an embodiment of the invention, after the porous substrate is immersed in the electrolyte composition, a drying process is further performed on the porous substrate immersed in the electrolyte composition.

According to a manufacturing method of a capacitor of an embodiment of the invention, before the porous substrate is immersed in the electrolyte composition, a cleaning process is further performed on the porous substrate.

Based on the above, in a capacitor of the invention, since both the porous substrate and the nano carbon material have a high porosity and therefore have a high specific surface area, both the porous substrate and the nano carbon material can adsorb a large amount of the electrolyte solution. As a result, the charge storage capability of the capacitor can be effectively increased. Moreover, since the porous substrate can effectively adsorb the electrolyte composition on the surface and in the holes thereof, the issue of leakage of the capacitor can also be prevented. Moreover, a capacitor of the invention can be manufactured by immersing the porous substrate in the electrolyte composition and forming electrodes on opposite surfaces of the porous substrate, and therefore the manufacture is simple and can be completed without other complex equipment, and the manufacturing costs are low as a result.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
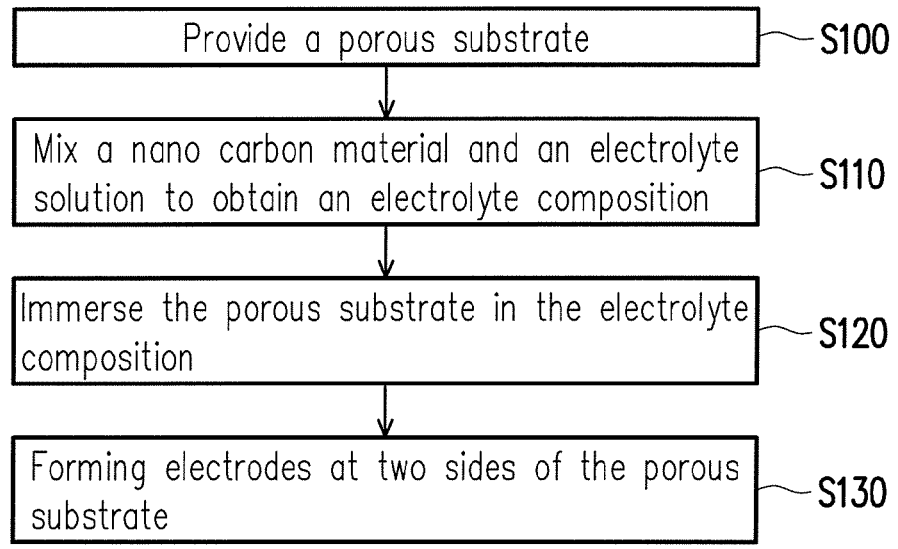
FIG. 1 is a schematic of the manufacturing process of a capacitor of an embodiment of the invention.
Figure 2:
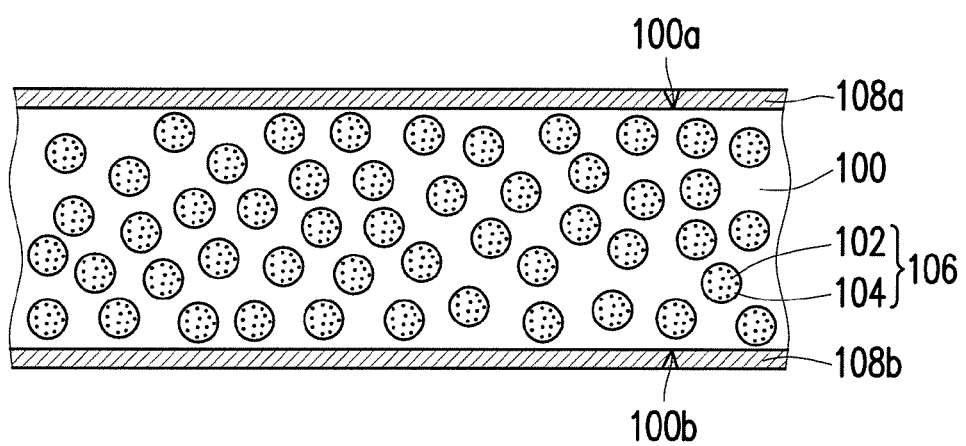
FIG. 2 is a schematic of a capacitor illustrated according to an embodiment of the invention.

FIG. 1 is a schematic of the manufacturing process of a capacitor of an embodiment of the invention. FIG. 2 is a schematic of a capacitor illustrated according to an embodiment of the invention. Referring to FIGS. 1 and 2, first, step S100 is performed, in which a porous substrate 100 is provided. The porous substrate 100 has a plurality of holes, and therefore has a high specific surface area. The material of the porous substrate 100 is, for instance, melamine, polystyrene, polyurethane, polyethylene, ethylene-vinyl acetate copolymer, thermoplastic elastomer, polyvinyl chloride, or other polymers.

In an embodiment, cleaning can optionally be performed on the porous substrate 100. The porous substrate 100 can be cleaned via acetone or other cleaning fluids to remove impurities on the surface and inside the holes of the porous substrate 100. However, the invention is not limited thereto. A common cleaning treatment can also be performed on the porous substrate 100 to remove impurities on the surface and inside the holes of the porous substrate 100.

Then, step S110 is performed, in which a nano carbon material 102 is added in an electrolyte solution 104, and the nano carbon material 102 and the electrolyte solution 104 are mixed to uniformly disperse the nano carbon material 102 in the electrolyte solution 104 so as to obtain an electrolyte composition 106. In this step, the used electrolyte solution 104 is, for instance, potassium hydroxide, sodium hydroxide, or sulfuric acid. In an embodiment, the nano carbon material 102 is, for instance, carbon aerogel. The carbon aerogel can have a particle having a particle size between 3 nm and 20 nm. The carbon aerogel has a porous structure, and the porosity thereof can exceed 50%. As a result, the carbon aerogel has a high specific surface area. In the present embodiment, the specific surface area of the carbon aerogel is, for instance, between 400 $m^2/g$ and 1000 $m^2/g$. Since the carbon aerogel has a high porosity and a high specific surface area, the carbon aerogel can effectively adsorb the electrolyte solution on the surface and in the holes thereof, and can therefore adsorb a larger amount of the electrolyte solution.

In another embodiment, the nano carbon material 102 is, for instance, expanded graphite. The expanded graphite has a porous structure (i.e., having a high specific surface area), and therefore can effectively adsorb the electrolyte solution on the surface and in the holes thereof, and as a result can adsorb a larger amount of the electrolyte solution. In other embodiments, other nano carbon materials capable of adsorbing a large amount of the electrolyte solution can also be used as the nano carbon material 102.

In the present embodiment, based on a total weight of the electrolyte composition 106, the content of the nano carbon material 102 is, for instance, between 1% and 10%. When the content of the nano carbon material 102 is in the above range, the electrolyte composition 106 can retain the characteristics of electrical insulation and high dielectric constant, and the nano carbon material 102 can be uniformly dispersed in the electrolyte solution 104 and not be aggregated into a ball.

It should be mentioned that, in the present embodiment, step S100 is performed first, and then step S110 is performed, but the invention is not limited thereto. In other embodiments, the order of step S100 and step S110 is not particularly limited.

Then, step S120 is performed, in which the porous substrate 100 is immersed in the electrolyte composition 106. During the immersion process of the electrolyte composition 106, the electrolyte composition 106 is gradually adsorbed on the porous substrate 100 such that the electrolyte composition 106 is present in both the holes and on the surface of the porous substrate 100. In the present embodiment, since the porous substrate 100 has a high porosity and has a high specific surface area, the porous substrate 100 can adsorb a large amount of the electrolyte composition 106.

In the present embodiment, after the immersion process, a drying process can also optionally be performed on the porous substrate 100. Specifically, the porous substrate 100 can be placed in an oven to perform baking. Of course, the invention is not limited thereto, and in another embodiment, the porous substrate 10 can be left to stand to perform a drying process.

Then, step S130 is performed, in which electrodes 108a and 108b are respectively formed on two opposite surfaces 100a and 100b of the porous substrate 100. In the present embodiment, the method of forming the electrodes 108a and 108b on the two opposite surfaces 100a and 100b of the porous substrate 100 includes, for instance, adhering the electrodes 108a and 108b on the two opposite surfaces 100a and 100b of the porous substrate 100. The material of the electrodes 108a and 108b is, for instance, silver, palladium, or aluminum. At this point, the manufacture of the capacitor 10 having the porous substrate 100 and the electrolyte composition 106 is complete.

In the capacitor 10, since the porous substrate 100 has a high porosity and has a high specific surface area, the porous substrate 100 can adsorb a large amount of the electrolyte composition 106. Moreover, since the nano carbon material 102 in the electrolyte composition 106 also has a high porosity and a high specific surface area, the nano carbon material 102 can also adsorb a large amount of the electrolyte solution 104. In other words, in the capacitor 10, the nano carbon material 102 and the porous substrate 100 can both adsorb a large amount of the electrolyte solution 104, and therefore the charge storage capability of the capacitor 10 can be effectively increased. Moreover, since the porous substrate 100 can effectively adsorb the electrolyte composition 106 on the surface and in the holes thereof, the issue of leakage of the capacitor can also be effectively prevented.

Moreover, the capacitor of the invention can be manufactured by first immersing the porous substrate in the electrolyte composition having the nano carbon material and the electrolyte solution, and then forming electrodes on opposite surfaces of the porous substrate. As a result, the manufacturing process is simple and overly complex equipment is not needed, and as a result the manufacturing costs are low.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A capacitor, comprising:
   a porous substrate having a plurality of holes;
   an electrolyte composition located in the holes of the porous substrate, the electrolyte composition comprising an electrolyte solution and a nano carbon material dispersed in the electrolyte solution; and
   a pair of electrodes respectively located on two opposite surfaces of the porous substrate.

2. The capacitor of claim 1, wherein a material of the porous substrate comprises melamine, polystyrene, polyurethane, polyethylene, ethylene-vinyl acetate copolymer, thermoplastic rubber, or polyvinyl chloride.

3. The capacitor of claim 1, wherein based on a total weight of the electrolyte composition, a content of the nano carbon material is between 1% and 10%.

4. The capacitor of claim 1, wherein the nano carbon material comprises expanded graphite or carbon aerogel.

5. The capacitor of claim 4, wherein the carbon aerogel comprises a particle having a particle size between 3 nm and 20 nm.

6. The capacitor of claim 4, wherein a porosity of the carbon aerogel exceeds 50%.

7. The capacitor of claim 4, wherein a specific surface area of the carbon aerogel is between 400 $m^2/g$ and 1000 $m^2/g$.

* * * * *